Patented Sept. 30, 1952

2,612,488

UNITED STATES PATENT OFFICE 2,612,488

STABILIZATION OF ORGANIC MATERIALS WITH ARYL POLYPHOSPHITES

Joseph F. Nelson, Rahway, N. J., assignor to Standard Oil Development Company, a corporation of Delaware No Drawing. Application November 2, 1950, Serial No. 193,751

13 Claims. (Cl. 260—45.5)

This invention relates to the stabilization of organic compounds which tend to deteriorate in storage or in use due to undesirable oxidation reactions. In accordance with this invention, these organic compounds are stabilized against oxidation by incorporating therein small amounts of novel aryl poly-phosphite condensation products.

Various organic compounds and mixtures, including mineral oils, resins, insecticides, soaps, lubricating oils, waxes, rubbers, polyolefins, such as polyisobutylene, etc., are adversely affected by oxygen, with the resultant formation of undesirable oxidation products, breakdown products, gums and usually discoloration of the organic compounds as well as other deleterious reactions.

Thus, for example, in the oil refining industry, in order to prepare lubricating oils of superior quality, it is generally necessary to stabilize the oil against degradation which normally occurs due to oxidation of the hydrocarbon components. In general, hydrocarbon mixtures falling in the lubricating oil boiling range, if unstabilized, will over a period of time under certain conditions be subject to gum formation, sludge formation, the formation of acids and the formation of objectionable color bodies.

It is also known that synthetic rubbers undergo changes due to further polymerization or degradation due to depolymerization on exposure to air and consequently yield on vulcanization inferior products unless there is incorporated therewith at time of synthesis a compound which stabilizes the synthetic rubber by largely preventing oxidation, degradation and/or cyclization of the chain molecules present in the polymer structure. Natural, as well as synthetic, rubbers require an antioxidant present in the vulcanizate in order that finished rubber products remain stable toward oxidation and heat during their useful life.

Certain simple aryl phosphites such as triphenyl phosphite are known to be stabilizers for rubbery materials. These simple phosphites however are subject to ready hydrolysis to low molecular weight products which tend to degrade the rubber under many conditions. This ready hydrolysis is also disadvantageous in synthetic rubber manufacture where the rubber as a slurry or a latex is in intimate contact with water. In addition, these simple phosphites are excessively volatile for many purposes, and are thus not adapted for high temperature uses.

It has now been found that aryl poly-phosphite condensation products produced by the reaction which comprises condensing an aromatic compound containing one hydroxyl group linked to the aromatic nucleus with a phosphorous compound, usually a halide having the formula $PX_3$ wherein X is a halogen radical selected from the group consisting of Cl, Br, and I radicals, and condensing the resulting product with an aromatic compound having two OH groups linked to the aromatic nucleus are extremely effective oxidation inhibitors and stabilizers for materials which usually degrade in the presence of air and/or heat. In addition, the compounds of this invention do not suffer from the above-listed disadvantages of the simple aryl phosphites.

The anti-oxidant products of this invention which are either very viscous liquids or resinous solids are complex chain type molecules. Their structure is illustrated in Formula I below:

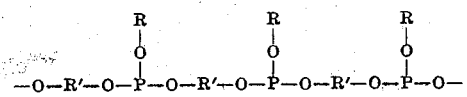

Formula I where R and R' are broadly aromatic hydrocarbon radicals, which can be different or similar, differing in the latter case in only one hydrogen atom and one valence. R and R' can thus be aryl, poly-aryl, alkaryl, fused aromatic ring radicals with or without alkyl side chains, etc. Ether linkages may also be present in the polyaryl radicals. These various structures are explained at greater length below, wherein the products of particular reactants are disclosed.

It should be noted that the recurring structural unit in the products of this invention is the unit illustrated in Formula II below:

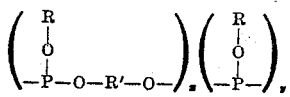

*Formula II* wherein $x$ is a natural number, $y$ is 0 or 1, but when $y$ is 0, $x$ is at least two.

It should be noted that each compound of this invention thus contains at least two phosphite groups. It is this configuration which is believed to impart the desired characteristics to the products of this invention.

The complete chain of the condensation products of this invention may be visualized as illustrated in Formula III below:

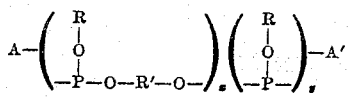

*Formula III* where A is a Cl, Br, OH, OR or OR'OH radical and A' is a different or similar radical selected from the same group except when $y$ is 0. In the latter case only, A' is a H atom.

The monohydric phenols that can be employed for the purpose of this invention are illustrated by di-isobutylphenol, para-hydroxy di-phenyl, thymol, monobenzyl hydroquinone, alpha-ethyl-phenyl-phenol, phenol, alpha and beta naphthol, o-, m-, and p-cresol, p-tert. butyl phenol and its o- and m- analogs, o-, m-, and p-ethyl phenol, isopropyl phenol, amyl phenols, dodecyl phenols, the methyl ethyl phenols, the trimethyl phenols, o-, m-, and p-hydroxy diphenyl methane, etc.

The di-hydric phenols that can be employed for the purpose of this invention are illustrated by hydroquinone, 2-5, di-tertiary butyl hydroquinone, resorcinol, pyrocatechol, p, p'-di-hydroxy diphenyl, the various dihydroxyl diphenyl methanes such as p-, p'-dihydroxyl diphenyl methane, the various dihydroxyl naphthalenes, 2,2,-di-(p-hydroxy phenyl) propane, o-amyl hydroquinone, ring alkylated resorcinols, o-ethyl hydroquinone, o-octyl hydroquinone, o-, o-di dodecyl hydroquinone, etc. The di-hydric phenols, wherein the hydroxyl radicals are para to each other, are particularly effective and desirable.

The products of this invention can be prepared by first condensing the mono-hydric phenol with a $PX_3$ compound in approximately equimolar ratios, wherein X is a halogen radical selected from the group consisting of Cl, Br and I radicals at a temperature of approximately 50 to 100° C. No catalyst need be employed and the reaction conveniently is continued until one molecule of HX is evolved. The resulting product is then reacted with approximately an equimolar amount of the di-hydric phenol at a temperature of approximately 50 to 300° C. This reaction takes about three hours or longer and the lower temperature is employed during the early course of reaction with the temperature raised in the latter stages of the reaction. It is desirable to strip off HX evolved during the reaction's course with a dry inert gas such as nitrogen or other inert carrier so as to prevent rupturing of the molecule by HX. It is also desirable to carry out the reaction in an inert atmosphere such as that of $N_2$, $CO_2$, etc. This is particularly true when alkylated phenols are employed.

The following examples are given to illustrate this invention and include both the preparation of the aryl polyphosphites of this invention and test results on their use as anti-oxidants.

EXAMPLE I

*Preparation of polyphosphite B (see Table I below)*

Diisobutylphenol (0.245 mole) and $PCl_3$ (0.245 mole) were placed in a 500 cc. flask equipped with a reflux condenser and thermometer. The outlet of the condenser was attached to a sodium hydroxide solution trap containing 0.245 mole NaOH to measure evolved HCl. Heating was accomplished with a Glas-Col mantle. The above mixture was heated slowly and allowed to reflux at the $PCl_3$ boiling point (76° C.) until reaction was essentially complete. Reflux condensing terminated at 110° C. pot temperature. At this time, the NaOH was found to be essentially neutralized to phenolphthalein indicating complete reaction of the phenol with one of the chloro groups in the $PCl_3$. The product was then cooled to room temperature and the 2,5-ditertiary butyl-hydroquinone (0.245 mole) added. Heating was continued for 3 hours or more while the temperatures gradually rose to about 300° C. HCl evolution continued during this period.

After cooling the resulting product, it was dissolved in 2 liters of diethyl ether. This solution was washed twice with a sodium bicarbonate-sodium chloride water solution and then washed twice with distilled water. After separating the ether layer and drying over anhydrous $Na_2SO_4$, the ether was stripped off to a final temperature of 225° C. An overall yield of 83.3 per cent was obtained.

A similar procedure was used in preparing the other materials listed in the Table I below:

TABLE I

*"Polyphosphites"*

RAW MATERIALS

| Product | | | | Phenolic, etc. | Moles | Properties of the Product |
|---|---|---|---|---|---|---|
| A | 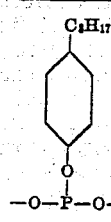 | 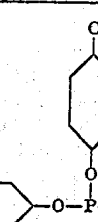 |  | Diisobutylphenol<br>Hydroquinone<br>$PCl_3$ | 0.245<br>.244<br>.27 | Straw colored very viscous liquid. |

TABLE I—Continued

*"Polyphosphites"*

RAW MATERIALS

| Product | Phenolic, etc. | Moles | Properties of the Product |
|---|---|---|---|
| B 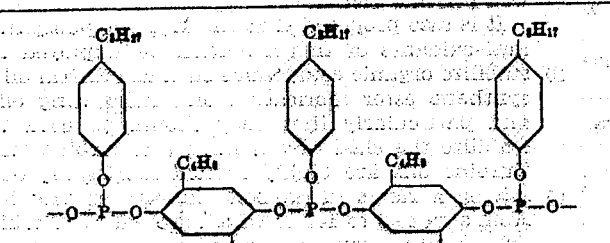 | Diisobutylphenol<br>2,5-ditertiarybutyl hydroquinone.<br>PCl₃ | .245<br>.245<br>.245 | Brittle amber colored solid at room temperature. Very viscous liquid at 70° C. |
| C 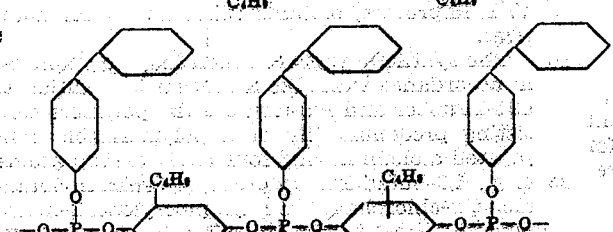 | p-Hydroxydiphenyl<br>ditertiary butyl hydroquinone.<br>PCl₃ | 0.218<br>.218<br>.218 | Brittle amber colored solid. |
| D 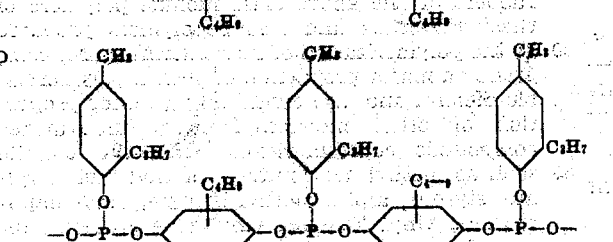 | Thymol<br>Ditertiary butyl hydroquinone.<br>PCl₃ | .218<br>.218<br>.218 | Violet colored very viscous liquid. |
| E 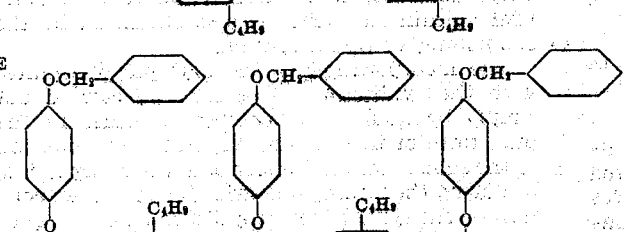 | Benzylhydroquinone.<br>Ditertiary butyl hydroquinone.<br>PCl₃ | 0.2<br>0.2 | Amber colored solid.<br>M. P. 78-86° C.<br>Analysis:<br>P, 6.26 wt. percent.<br>C, 69.55 wt. percent.<br>H, 7.01 wt. percent.<br>Cl, 1.33 wt. percent. |
| F 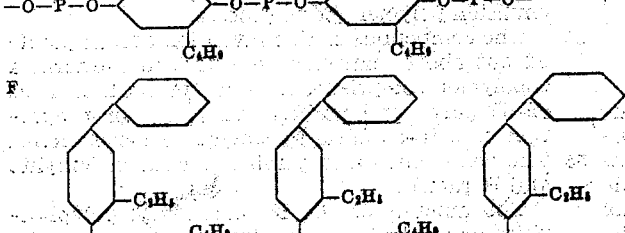 | Alpha-Ethyl phenyl phenol. Ditertiary butyl hydroquinone.<br>PCl₃ | 0.2<br>0.2<br>0.2 | Brittle straw colored solid. |
| G 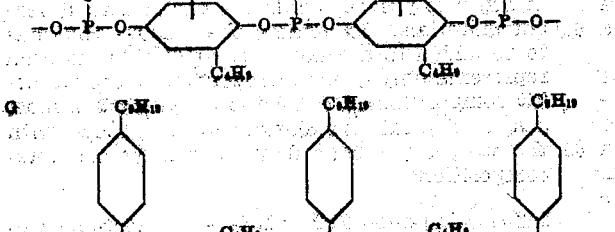 | p-polypropyl phenol.<br>Ditertiary butyl hydroquinone.<br>PCl₃ | 1.0<br>1.0<br>1.0 | Amber colored solid.<br>M. P. 36-38° C.<br>Analysis:<br>P, 5.52 wt. percent.<br>C, 73.82 wt. percent.<br>H, 9.69 wt. percent.<br>Cl, 0.<br>O, 11.62 wt. percent. |

EXAMPLE II

1% of the products B, G, and C of Table I above were tested for anti-oxidant effect on raw Paracril (a butadiene-acrylonitrile synthetic rubber). The results follow:

| Antioxidant—1% Added to Polymer | Percent Gel in Polymer After Aging at 60° C. | | | |
|---|---|---|---|---|
| | 1 wk. | 2 wks. | 4 wks. | 6.5 wks. |
| Product B | 1 | 1 | 4 | 17 |
| Product C | 1 | 2 | 3 | 3 |
| Product G | 0.9 | | 1.485 | |
| Phenyl beta naphthylamine | 2 | | 26 | 48 |
| Para phenyl phenol | 33 | 50 | 45 | 65 |

EXAMPLE III

1% of product G of Table I and a similar quantity of a well known commercial anti-oxidant 2,6-di-t-butyl-4-methylphenol were tested for anti-oxidant efficacy on cured Paracril. The results follow:

| Description | 2,6-di-t-butyl-4-methylphenol | | | Polyphosphite G | | |
|---|---|---|---|---|---|---|
| | I | II | III | I | II | III |
| Unaged: I—Tensile Strength, II—300% Modulus, and III—Elongation | 1,885 | 635 | 710 | 1,890 | 655 | 715 |
| Aged 6 Hours at 300° F.: I—Tensile Strength, II—300% Modulus, and III—Elongation | 1,795 | 980 | 445 | 1,875 | 1,090 | 435 |
| Aged 16 Hours at 300° F.: I—Tensile Strength, II—300% Modulus, and III—Elongation | 570 | | 105 | 640 | | 105 |

These data show that the physicals of the vulcanizates and the aging are not adversely affected by the polyphosphites, whereas these additives are superior with respect to preventing gel formation and they also cause less discoloration of the Paracril upon heating.

EXAMPLE IV

1% of product G of Table I and a similar quantity of 2,6-di-t-butyl-4-methylphenol were compared as to their color stabilizing effect on raw Paracril aged for 10 days at 60° C. The sample stabilized with 2,6-di-t-butyl-4-methylphenol turned a dark yellow to brown color, whereas the polyphosphite caused little discoloration, only a few light yellow spots being present in the aged polymer.

It is apparent from the above results that the products of this invention are very good in preventing undesirable gel formation. As a matter of fact from 16 to 3 times less gel was formed than when phenyl beta naphthylamine was used. The latter has always been considered one of the best stabilizers for uncured Paracril.

The compounds of this invention were tested and also found to possess anti-oxidant activity on synthetic esters, synthetic rubbers, lube oils, etc.

It is to be seen from the above examples that the compounds of this invention provide markedly effective oxidation inhibition. As a result of these tests, it is contemplated in accordance with this invention that the class of inhibitors indicated may be used to stabilize oxidation unstable mixtures. The indicated aryl polyphosphites are particularly adapted for use with synthetic ester lubes, mineral oils, greases formed from metallic stearate and esters, rubbers, and wax polymer blends.

It is also proposed that the aryl polyphosphite anti-oxidants of this invention be employed to stabilize organic compounds such as mineral oils, synthetic ester lubricating oils, lubricating oils and particularly that they should be used to stabilize the class of oils known as turbine oils. Turbine oils are highly refined lubricating oils having a range in Saybolt viscosity at 210° F., from about 43 to 145 to which are added suitable anti-oxidants, rust preventers, pour depressants, V. I. improvers, metallic soaps and other additives.

The synthetic rubbers which may be stabilized in accordance with this invention in addition to GR-I rubber and Paracril are the polymers consisting predominantly of a polymerizable conjugated diolefin having four to six carbon atoms, e. g., 1,3-butadiene, isoprene, 2,3-dimethylbutadiene, 2-chlorobutadiene-1,3, piperylene, 2-methylpentadiene-1,3 and the like; hence synthetic rubbers of the above class include polymers of these materials and also copolymers prepared by the polymerization of monomer mixtures comprising a major proportion of such a polymerizable diolefin and also containing a minor proportion of other monoethylenically unsaturated compounds copolymerizable with the diolefin such as methyl acrylonitrile, methyl methacrylate, styrene, alpha methyl styrene, vinyl naphthalene, vinyl ketones, vinylidene chloride, diethyl fumarate, vinyl pyridine, and the like. Natural vulcanized rubber is also stabilized by the compounds of this invention.

The incorporation of the aryl polyphosphites with the synthetic rubber may be carried out simply by adding the compound either in the pure form or in solution, suspension or emulsion to the solid synthetic rubber in a water dispersion, or during the milling operation, or to a latex containing the synthetic rubber dispersed in an aqueous medium such as is ordinarily obtained by an emulsion polymerization process.

The compounds of this invention are, as pointed out above, extremely effective in Paracril, a copolymer comprising a major proportion, i. e., 85–50 parts, of butadiene and a minor proportion, i. e. 15–50 parts by weight, of acrylonitrile. The compounds also stabilize blends of Vinylite and Paracril.

The amount of the indicated aryl polyphosphite added to the normally oxidizable material in order to prevent oxidation varies with different materials. In general the amount that has to be added to the normally oxidizable material represents only a small proportion of the resulting compositions, i. e. 0.003–5 wt. percent in most cases. Typical formulations are as follows with the weight per cent figure based on the total compositions.

Lubricating oils—0.02 to 10% and preferably 1 to 2% anti-oxidant by weight

Rubbers and plastics—0.1 to 5% by weight

The products of this invention may be utilized in conjunction with other anti-oxidants in order to obtain desirable combinations of properties. Among the other anti-oxidant materials which may be employed are phenyl-beta-naphthylamine, naphthols, substituted naphthols, substituted phenols, substituted catechols, substituted hydroquinones, alkyl phenol sulfides, ketone-amine condensation products and the like.

The anti-oxidant products of this invention have many advantages, among which are their extreme potency, non-staining character, ease of preparation, good color retention, low volatility and difficult hydrolysis.

It is to be understood that the invention is not limited to the specific examples which have been offered merely as illustrations, since other derivatives can be prepared, and that modifications may be made without departing from the spirit of the invention.

What is claimed is:

1. As a new composition of matter, an aryl polyphosphite resinous condensation product produced by the reaction which comprises condensing an aromatic compound containing one hydroxyl group linked to the aromatic nucleus with a phosphorus compound having the formula $PX_3$, wherein X is a halogen radical selected from the group consisting of Cl, Br and I radicals and condensing the resulting product with an aromatic compound having two OH groups linked to the aromatic nucleus, said condensation product containing the

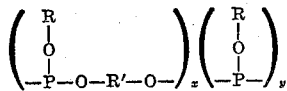

structural unit, wherein R and R' are aromatic radicals and wherein $x$ is a natural number, $y$ is a number selected from the group consisting of 0 and 1, but when $y$ is 0, $x$ is at least two.

2. A composition as in claim 1, in which the monohydric phenol, the di-hydric phenol and the $PX_3$ are reacted in approximately equimolar proportions.

3. A composition as in claim 2, in which the di-hydric phenol contains the hydroxyl groups para to each other.

4. A composition as in claim 1, in which the monohydric phenol is diisobutylphenol, and the di-hydric phenol is 2,5-ditertiarybutyl hydroquinone.

5. A composition as in claim 1, in which the monohydric phenol is p-hydroxydiphenyl, and the di-hydric phenol is ditertiary butyl hydroquinone.

6. A composition as in claim 1, in which the monohydric phenol is diisobutylphenol and the di-hydric phenol is hydroquinone.

7. A composition of matter comprising an organic material normally subject to oxidative changes containing a minor proportion effective as an anti-oxidant of an aryl polyphosphite resinous condensation product produced by the reaction which comprises condensing an aromatic compound containing one hydroxyl group linked to the aromatic nucleus with a phosphorus compound having the formula $PX_3$, wherein X is a halogen radical selected from the group consisting of Cl, Br, and I radicals and condensing the resulting product with an aromatic compound having two OH groups linked to the aromatic nucleus, said resinous condensation product containing the

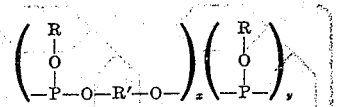

structural unit, wherein R and R' are aromatic radicals and wherein $x$ is a natural number, $y$ is a number selected from the group consisting of 0 and 1, but when $y$ is 0, $x$ is at least two.

8. A stabilized synthetic rubber composition comprising a synthetic rubber having admixed therewith a minor proportion effective as an anti-oxidant of an aryl polyphosphite condensation product produced by the reaction which comprises condensing an aromatic compound containing one hydroxyl group linked to the aromatic nucleus with a phosphorus compound having the formula $PX_3$, wherein X is a halogen radical selected from the group consisting of Cl, Br and I radicals and condensing the resulting product with an aromatic compound having two OH groups linked to the aromatic nucleus, said condensation product containing the

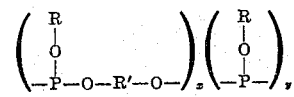

structural unit, wherein R and R' are aromatic radicals and wherein $x$ is a natural number, $y$ is a number selected from the group consisting of 0 and 1, but when $y$ is 0, $x$ is at least two.

9. A synthetic rubber composition as in claim 8, in which the aryl polyphosphite is present in an amount of from 0.1 to 5 wt. per cent.

10. A composition as in claim 9, in which the synthetic rubber is a butadiene, acrylonitrile synthetic rubber.

11. A stabilized synthetic rubber composition comprising a butadiene, acrylonitrile synthetic rubber having admixed therewith in an amount of from 0.1 to 5 wt. per cent of an aryl polyphosphite condensation product produced by the reaction which comprises condensing disobutyl phenol with $PCl_3$ in approximately equimolar proportions and condensing the resulting product with 2,5-dietertiary butyl hydroquinone in approximately equimolar proportions, said resinous product containing the

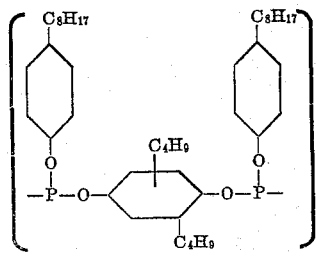

structural unit.

12. A stabilized synthetic rubber composition comprising a butadiene, acrylonitrile synthetic rubber having admixed therewith in an amount of from 0.1 to 5 wt. per cent of an aryl polyphosphite condensation product produced by the reaction which comprises condensing p-hydroxydiphenyl with $PCl_3$ in approximately equimolar proportions and condensing the resulting product with ditertiary butyl hydroquinone in approximately equimolar proportions, said product containing the

[structure: bracketed unit with two phenyl-O-P groups linked via a cyclohexane ring bearing two C₄H₉ groups and an O]

structural unit.

13. A composition as in claim 2, in which the butadiene, acrylonitrile synthetic rubber comprises 85–50 parts by weight of butadiene and 15–50 parts by weight of acrylonitrile.

JOSEPH F. NELSON.

No references cited.